United States Patent
Leung et al.

(10) Patent No.: US 8,804,032 B2
(45) Date of Patent: Aug. 12, 2014

(54) WAFER LEVEL CAMERA MODULE WITH SNAP-IN LATCH

(75) Inventors: Kevin Ka Kei Leung, Milpitas, CA (US); Wen Hua Lin, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/435,596

(22) Filed: Mar. 30, 2012

(65) Prior Publication Data
US 2013/0258181 A1    Oct. 3, 2013

(51) Int. Cl.
*H04N 5/225* (2006.01)
*G03B 17/02* (2006.01)

(52) U.S. Cl.
USPC ............ 348/374; 348/373; 348/375; 396/535

(58) Field of Classification Search
CPC ... H04N 5/225; H04N 5/2254; H04N 5/2257; H04N 5/2253; G02B 9/12; G02B 7/021
USPC .................................. 348/373, 374, 335, 340
See application file for complete search history.

(56) References Cited

U.S. PATENT DOCUMENTS

| | | | |
|---|---|---|---|
| 7,796,187 B2 * | 9/2010 | Shangguan et al. | 348/374 |
| 8,085,344 B2 * | 12/2011 | Mizumura | 348/374 |
| 8,164,676 B2 * | 4/2012 | Tian | 348/340 |
| 2004/0189853 A1 | 9/2004 | Takeuchi et al. | |
| 2008/0252775 A1 | 10/2008 | Ryu et al. | |
| 2008/0278621 A1 * | 11/2008 | Cho et al. | 348/374 |
| 2009/0096051 A1 | 4/2009 | Sugiyama et al. | |
| 2009/0122426 A1 | 5/2009 | Cheng | |
| 2009/0206431 A1 | 8/2009 | Bolken et al. | |
| 2009/0321861 A1 * | 12/2009 | Oliver et al. | 257/432 |
| 2011/0032409 A1 | 2/2011 | Rossi et al. | |
| 2011/0037886 A1 | 2/2011 | Singh et al. | |
| 2011/0050979 A1 | 3/2011 | Rudmann | |
| 2011/0130177 A1 * | 6/2011 | Halliday | 455/575.1 |
| 2011/0286736 A1 | 11/2011 | Aizawa et al. | |
| 2013/0258181 A1 | 10/2013 | Leung et al. | |

* cited by examiner

Primary Examiner — James Hannett
Assistant Examiner — Padma Haliyur
(74) Attorney, Agent, or Firm — Blakely Sokoloff Taylor & Zafman LLP (57) ABSTRACT

An apparatus includes an image sensor module with a lens stack disposed on the image sensor module. A protective tube is disposed on the image sensor module and encloses the lens stack. The protective tube includes an outer wall having a snap-in latch element disposed thereon. A metal housing encloses the protective tube. The metal housing includes a housing foot and inner wall having an opposite snap-in latch element disposed thereon. The image sensor module is adapted to be secured between the housing foot of the metal housing and the protective tube when the opposite snap-in latch element of the metal housing is engaged with the snap-in latch element of the protective tube.

22 Claims, 7 Drawing Sheets

PRIOR ART

FIG. 7C

WAFER LEVEL CAMERA MODULE WITH SNAP-IN LATCH

REFERENCE TO RELATED APPLICATION(S)

This application is related to co-pending application Ser. No. 13/435,649, filed Mar. 30, 2012, entitled "Wafer Level Camera Module With Protective Tube," and assigned to the Assignee of the present application.

BACKGROUND INFORMATION

1. Field of the Disclosure

The present invention relates generally to image sensors. More specifically, embodiments of the present invention are related to wafer level camera modules.

2. Background

A wafer level camera module is a camera module that has a small footprint and can be utilized in applications such for example mobile phones, notebook computers, tablet computers, and the like. A wafer level camera module includes optics to focus an image and an image sensor for sensing the image. In order to capture a high quality image, the optics of the camera module typically includes several lenses that are separated by glass wafers and/or spacers. The lenses are stacked in a lens stack. The lens stack is disposed on an image sensor module. The lens stack and the image sensor module are typically enclosed within a metal housing.

There are continuing efforts to reduce production costs and improve yields of the manufacturing and assembly of wafer level camera modules. A consequence of low yields is increased production costs. Accordingly, a wafer level camera module and wafer level camera module assembly method that may increase yields and thus lower production costs is desired. Furthermore, wafer level camera modules having enhanced mechanical strength, improved electromagnetic compatibility (EMC) performance, and reduced stray light related artifacts are desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

As will be shown, methods and apparatuses that provide examples of a wafer level camera module with snap-in latch are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Example methods and apparatuses directed to a wafer level camera module with snap-in latch are disclosed. As will be appreciated, a wafer level camera module and wafer level camera module assembly method according to the teachings of the present invention may provide increased yields with reduced production costs. In addition, examples of the disclosed wafer level camera modules further provide enhanced mechanical strength, improved electromagnetic compatibility (EMC) performance, and reduced stray light related artifacts in accordance with the teachings of the present invention.

Figure 1:
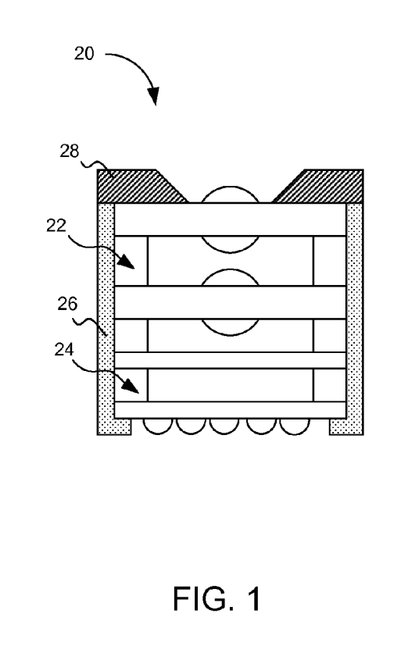
FIG. 1 is an illustration of a typical wafer level camera module.

To illustrate, FIG. 1 is a schematic diagram of a typical wafer level camera module 20. Wafer level camera module 20 includes a lens stack 22 and an image sensor module 24 in a metal housing 26. An interposer 28, which is a cap with an aperture, is configured to close metal housing 26.

Figure 2:
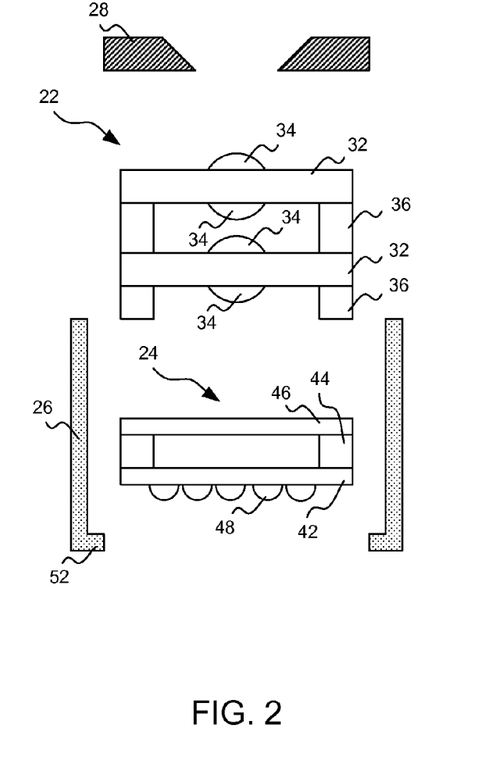
FIG. 2 illustrates a lens stack, an image sensor module, a metal housing, and an interposer in a typical wafer level camera module.

FIG. 2 illustrates lens stack 22, image sensor module 24, metal housing 26, and interposer 28. As shown, lens stack 22 includes one or more lenses 34 on glass wafers 32 and spacers 36. Image sensor module 24 includes an image sensor die 42, a spacer 44 mounted on the image sensor die, a cover glass 46 mounted on the spacer, and a plurality of solder balls 48 mounted to the image sensor die. Metal housing 26 may include a bent hook-like housing foot 52.

Figure 3A:
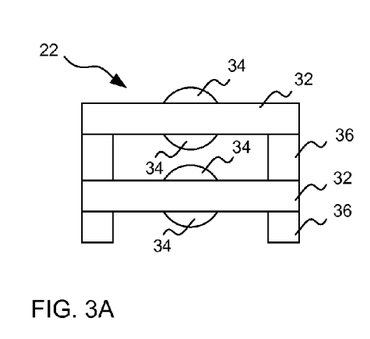
FIGS. 3A-3E illustrate a process for assembling an example wafer level camera module in accordance with the teachings of the present invention.
Figure 3B:
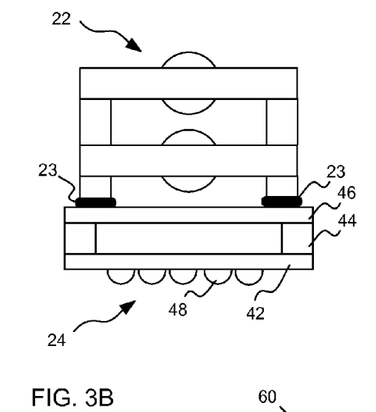

FIGS. 3A-3E illustrate a process for assembling an example wafer level camera module in accordance with the teachings of the present invention. FIG. 3A shows a lens stack 22 including one or more lenses 34 on glass wafers 32 and spacers 36. FIG. 3B shows lens stack 22 disposed on an image sensor module 24, which includes an image sensor die 42, spacers 44 mounted on the image sensor die, a cover glass 46 mounted on spacers 44, and a plurality of solder balls 48 mounted to the image sensor die. In other examples, it is appreciated that plurality of solder balls 48 may be replaced with solder bumps, solder pads, or other electrical connection elements. In one example, glue or an adhesive may be applied between lens stack 22 and image sensor module 24.

Figure 3C:
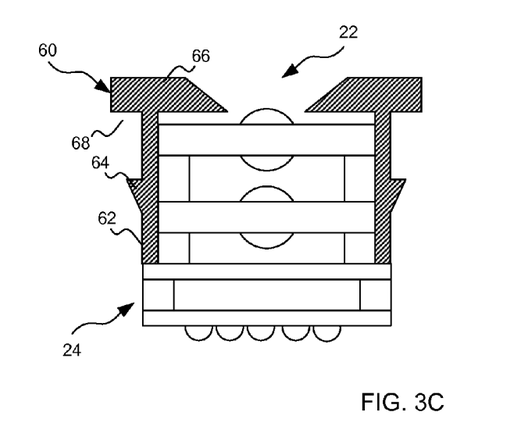

In the illustrated example, FIG. 3C shows a protective tube 60 disposed on image sensor module 24 and enclosing lens stack 22. As shown, protective tube 60 includes an outer wall 62 having a snap-in latch element 64 disposed thereon. As shown in the depicted example, snap-in latch element 64 may be a male latch element. In the example, protective tube 60 includes a cap 66 with aperture as shown. In one example, cap 66 includes extension or ledge 68.

Figure 3D:
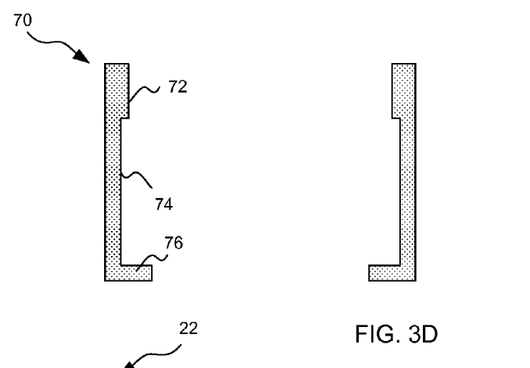

In the illustrated example, FIG. 3D shows a metal housing 70 enclosing protective tube 60. As shown in the depicted example, metal housing includes a hook-like housing foot 76 and an inner wall 74 having an opposite snap-in latch element 72 disposed thereon. As shown in the depicted example, opposite snap-in latch element 72 may be a female latch element. In one example, the image sensor module 24 is adapted to be secured between housing foot 76 of metal housing 70 and protective tube 60 when opposite snap-in latch element 72 of metal housing 70 is engaged with the snap-in latch element 64 of protective tube 60. As shown in the example, snap-in latch element 64 is a male latch element that includes a protruding part, and opposite snap-in latch element 72 is a female latch element that includes a recess adapted to accept and engage with the protruding part of the male latch element.

Figure 3E:
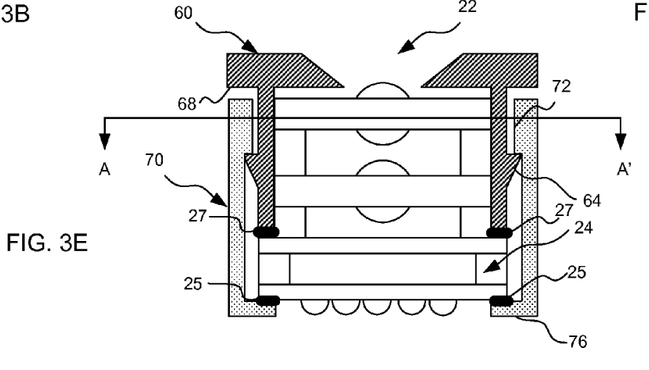

FIG. 3E illustrates metal housing 70 enclosing protective tube 60 with protective tube 60 being inserted into metal housing 70. As such, snap-in latch element 64 is engaged with opposite snap-in latch element 72 resulting in image sensor module 24 being secured between housing foot 76 and protective tube 60. As shown, the inner surface of housing foot 76 presses against image sensor module 24 from one side and protective tube 60 presses image sensor module 24 from the other side. In this manner, the snap-in latching mechanism between protective tube 60 and metal housing 70 secures lens stack 22 and image sensor module 24 in accordance with the teachings of the present invention.

It is appreciated that protective tube 60 engaged with metal housing 70 as described better secures and aligns lens stack 22 and image sensor module 24. Thus, the utilization of protective tube 60 with metal housing 70 as described increases the yields and in turn, reduces overall production costs. Protective tube 60 also enhances the mechanical strength, improves electromagnetic compatibility (EMC) performance, and prevents stray light related artifacts in accordance with the teachings of the present invention.

In one example, glue or a first adhesive 23 may be applied between lens stack 22 and image sensor module 24, as shown in FIG. 3B. In addition, a second adhesive 25 may be applied between the inner surface of housing foot 76 and image sensor module 24, and a third adhesive 27 may be applied between protective tube 60 and image sensor module 24, as shown in the example depicted in FIG. 3E.

Figure 4:
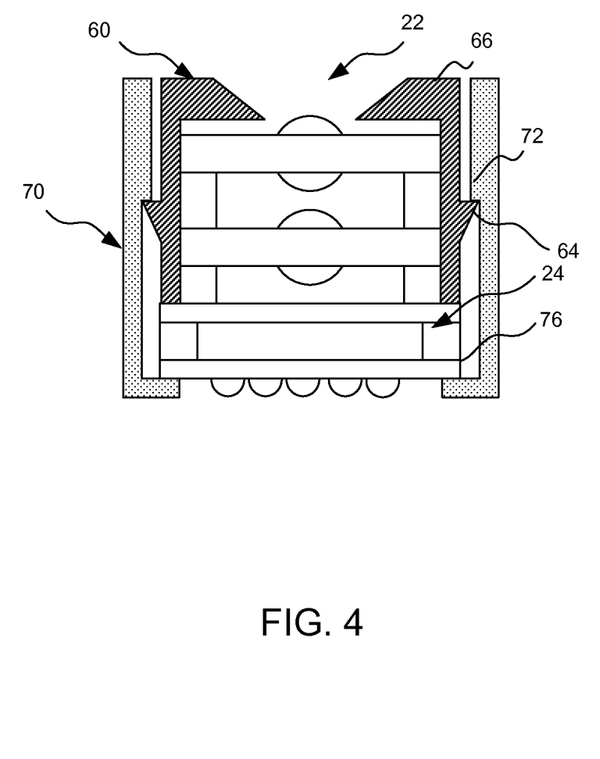
FIG. 4 illustrates an example of a cap of a protective tube without a ledge in accordance with the teachings of the present invention.

FIG. 4 illustrates another example wafer level camera module in accordance with the teachings of the present invention. It is noted that the example wafer level camera module illustrated in FIG. 4 shares many similarities with the example wafer level camera module illustrated in FIGS. 3A-3E. However, a difference is that the example wafer level camera module illustrated in FIG. 4 shows cap 66 of protective tube 60 without a ledge 68, as illustrated in the example wafer level camera module shown in FIGS. 3A-3E.

Figure 5A:
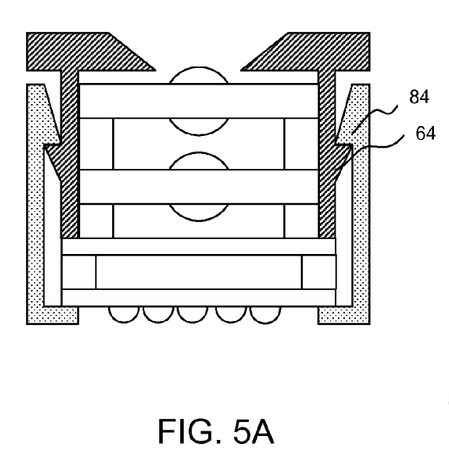
FIGS. 5A-5C illustrate various examples of protective tubes in accordance with the teachings of the present invention.
Figure 5B:
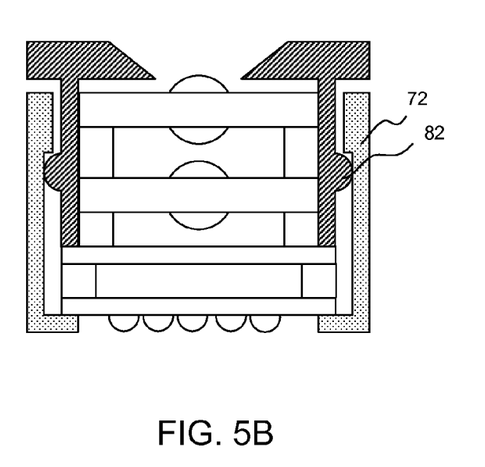
Figure 5C:
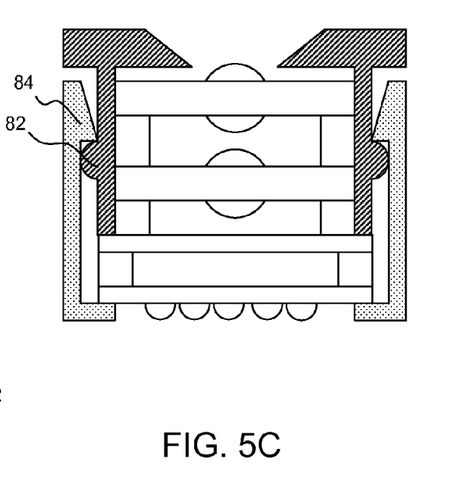

It is noted that in various examples, a male latch element for snap-in latch element 64 of protective tube 60 may be implemented using a variety of different shapes including for example a triangular shaped snap-in latch element 64 as shown in FIG. 3C, FIG. 3E, FIG. 4 and FIG. 5A, or for example a hemisphere shaped snap-in latch element 82 as shown in FIG. 5B and FIG. 5C. In addition, a female latch element for opposite snap-in latch element 72 of metal housing 70 may be implemented using a variety of different shapes including for example a flat shaped opposite snap-in latch element 72 as shown in FIG. 3D, FIG. 3E, FIG. 4 and FIG. 5B, or for example a slope shaped opposite snap-in latch element 84 as shown in FIG. 5A and FIG. 5C. It is appreciated that other combinations of shapes are also possible so long as snap-in latch element 64 engages with opposite snap-in latch element 72 to secure image sensor module 24 in accordance with the teachings of the present invention.

In an assembly process of one example, each component, including the lens stack, the image sensor module, the protective tube, and the metal housing, may all be singulated and assembled individually as shown and described with respect to FIGS. 3A-3E for explanation purposes. In another example, the components may be assembled in wafer level as shown in the example below with respect to FIGS. 6A-6I. It is appreciated that although FIGS. 6A-6I illustrate three units of wafer level camera modules for explanation purposes, there may be hundreds or thousands units on a wafer in accordance with the teachings of the present invention.

Figure 6A:
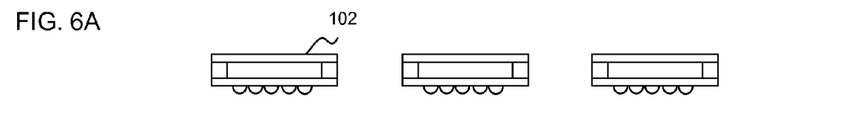
FIGS. 6A-6I illustrate an example of an assembly process in wafer level using the reconstruction of components in wafer level after singulation in accordance with the teachings of the present invention.
Figure 6B:
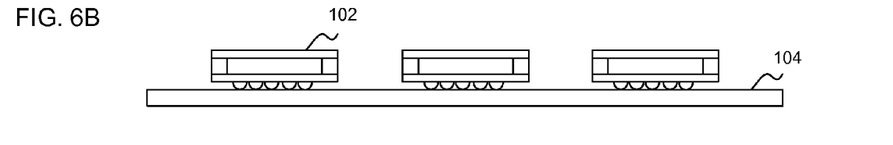
Figure 6C:
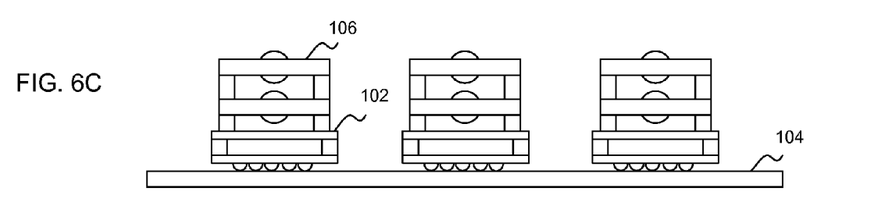
Figure 6D:
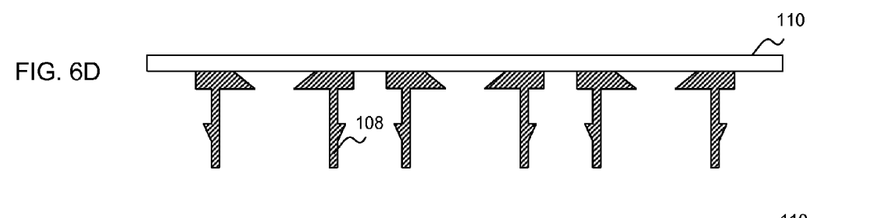
Figure 6E:
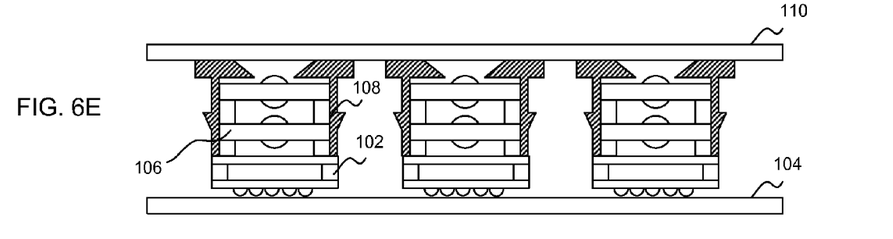
Figure 6F:
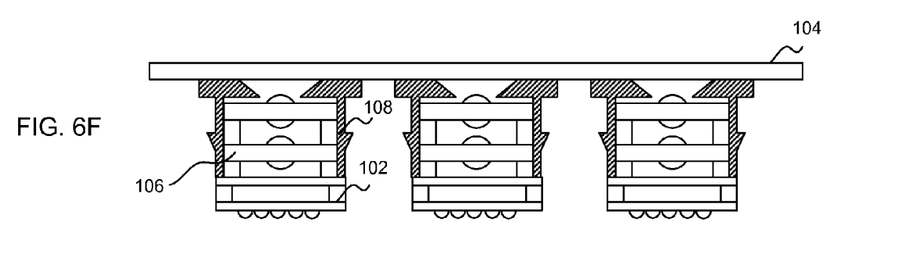
Figure 6G:
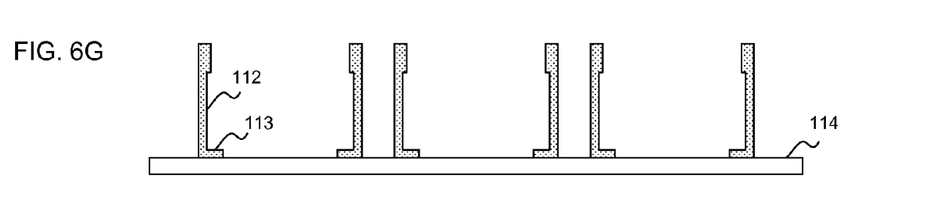
Figure 6H:
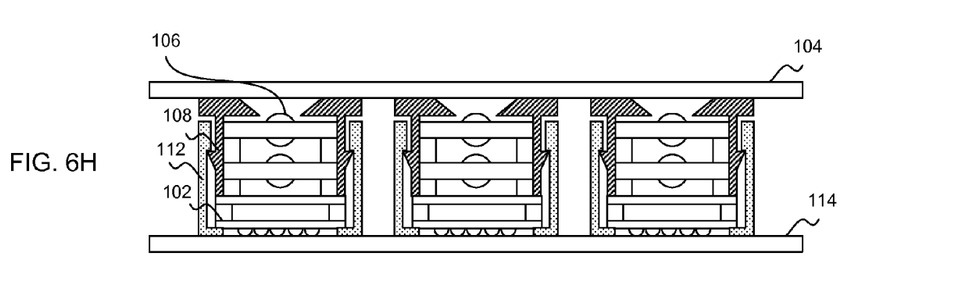
Figure 6I:
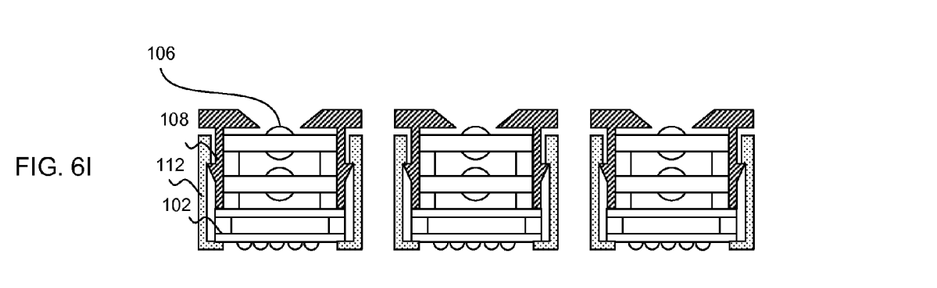

To illustrate, FIGS. 6A-6I show an example assembly process in wafer level using the reconstruction of components in wafer level after singulation, in accordance with the teachings of the present invention. FIG. 6A shows that image sensor modules 102 are singulated after they are fabricated in wafer level. FIG. 6B shows that the singulated image sensor modules 102 are reconstructed or rearranged back in wafer level by mounting them on a substrate or a tape 104. FIG. 6C shows that lens stacks 106 are singulated after they are fabricated in wafer level, and disposed on image sensor modules 102. Glue or an adhesive may be applied between lens stacks 106 and image sensor modules 102. FIG. 6D shows that the fabricated protective tubes 108 are reconstructed in wafer level by mounting them on a substrate or a tape 110. FIG. 6E shows protective tubes 108 disposed on image sensor modules 102. FIG. 6F shows the substrate or tape 104 mounting image sensor modules 102 being removed. FIG. 6G shows that the fabricated metal housings 112 including housing feet 113 are reconstructed in wafer level by mounting them on a substrate or a tape 114. FIG. 6H shows that protective tubes 108 are inserted into metal housings 112 such that the snap-in latch elements are engaged. FIG. 6I shows substrate or tape 114 mounting metal housings 112 and substrate or tape 104 mounting protective tubes 108 being removed. Metal housings 112 enclose protective tubes 108.

In one example, glue or an adhesive may be applied between the inner surface of housing feet 113 of metal housings 112 and image sensor modules 102, and between protective tubes 108 and image sensor modules 102.

In various examples, some components may not necessarily be singulated in the order represented above by FIGS. 6A-6I for explanation purposes. For instance, in one example, image sensor modules 102 may not be singulated until the step shown in FIG. 6E. Other arrangements of singulation and reconstruction are possible, including the reconstruction of lens stacks 106 in wafer level in accordance with the teachings of the present invention.

Figure 7A:
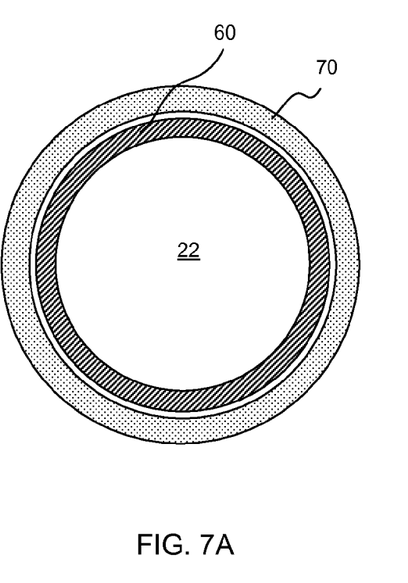
FIGS. 7A-7C illustrate various examples of cross-section shapes of example lens stacks, protective tubes and metal housings in accordance with the teachings of the present invention.
Figure 7B:
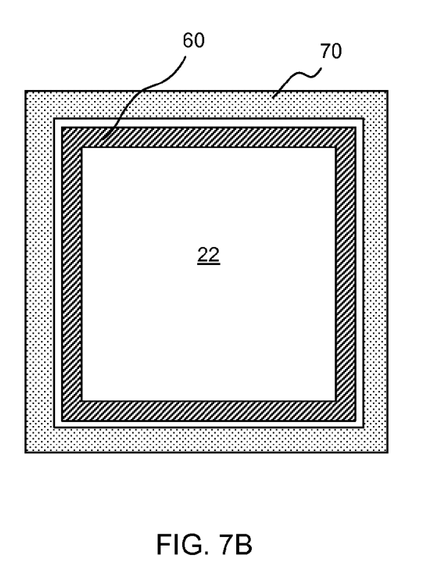
Figure 7C:
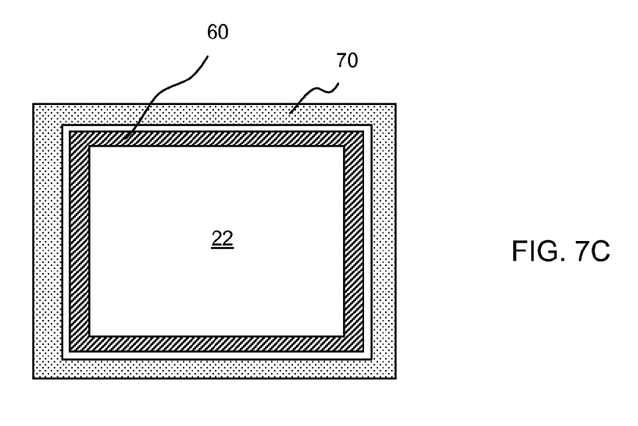

It is to be understood that the cross-section of lens stacks, protective tubes and metal housings illustrated in the above described figures can be circular, square, rectangular or other shapes. To illustrate, FIGS. 7A-7C are cross-section illustrations of various examples along line A-A' of the example depicted in FIG. 3E. As shown, FIG. 7A illustrates a cross-section of lens stack 22, protective tube 60 and metal housing 70 having a circular shape. FIG. 7B illustrates a cross-section of lens stack 22, protective tube 60 and metal housing 70 having a square shape. FIG. 7C illustrates a cross-section of lens stack 22, protective tube 60 and metal housing 70 having a rectangular shape.

In the examples shown in the previous figures, there is a gap between lens stack 22 and cap 66 of protective tube 60. In other examples, it is appreciated that there may be no gap between lens stack 22 and cap 66 of protective tube 60 (not shown) in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus comprising:
   an image sensor module;
   a lens stack disposed on the image sensor module, the lens stack including a plurality of lenses, a plurality of glass wafers, and a plurality of spacers;
   a protective tube disposed on the image sensor module and enclosing the lens stack, the protective tube including an outer wall having a snap-in latch element disposed thereon; and
   a metal housing enclosing the protective tube, the metal housing including a housing foot and inner wall having an opposite snap-in latch element disposed thereon, wherein the image sensor module is adapted to be secured and aligned between the housing foot of the metal housing and the protective tube when the opposite snap-in latch element of the metal housing is engaged with the snap-in latch element of the protective tube, wherein the protective tube.

2. The apparatus of claim 1, wherein a first adhesive is applied between the lens stack and the image sensor module.

3. The apparatus of claim 1, wherein a second adhesive is applied between the housing foot and the image sensor module.

4. The apparatus of claim 1, wherein a third adhesive is applied between the protective tube and the image sensor module.

5. The apparatus of claim 1, wherein the image sensor module comprises an image sensor die, a spacer mounted on the image sensor die, a cover glass mounted on the spacer, and a plurality of solder balls mounted to the image sensor die.

6. The apparatus of claim 1, wherein the lens stack comprises at least one lens.

7. The apparatus of claim 1, wherein the protective tube includes a cap having a ledge.

8. The apparatus of claim 1, wherein the snap-in latch element disposed on the outer wall of the protective tube is one of a triangular shape male latch element and a hemisphere shape male latch element.

9. The apparatus of claim 1, wherein the opposite snap-in element disposed on the inner wall of the metal housing is one of a flat female latch element and a slope shape female latch element.

10. The apparatus of claim 1, wherein a cross-section of the lens stack, the protective tube, and the metal housing is one of circular, square, and rectangular shapes.

11. A method for assembly comprising:
    attaching a plurality of lens stacks onto a plurality of image sensor modules, wherein each one of the plurality of lens stacks include a plurality of lenses, a plurality of glass wafers, and a plurality of spacers;
    enclosing the plurality of lens stacks in a plurality of protective tubes, wherein each one of the protective tubes includes an outer wall having a snap-in latch element disposed thereon;
    enclosing the plurality of protective tubes in a plurality of metal housings, wherein each one of the metal housings includes a housing foot and an inner wall having an opposite snap-in latch element disposed thereon; and
    securing and aligning the image sensor modules between the housing feet of the plurality of metal housings and the plurality of protective tubes by engaging the opposite snap-in latch elements of the plurality of metal housings with the snap-in latch elements of the plurality of protective tubes, wherein the plurality of protective tubes engaged with the plurality of metal housing improve an electromagnetic compatibility (EMC) performance.

12. The method of claim 11 wherein attaching the plurality of lens stacks onto the plurality of image sensor modules comprises applying a first adhesive between the plurality of lens stacks and the plurality of image sensor modules.

13. The method of claim 11 further comprising applying a second adhesive between the housing feet of the plurality of metal housings and the plurality of image sensor modules.

14. The method of claim 11 further comprising applying a third adhesive between the plurality of protective tubes and the plurality of image sensor modules.

15. The method of claim 11 further comprising singulating the plurality of image sensor modules after fabricating the plurality of image sensor modules in wafer level.

16. The method of claim 11 further comprising singulating the plurality of lens stacks after fabricating the plurality of lens stacks in wafer level.

17. The method of claim 11 further comprising mounting the plurality of protective tubes on a first tape to reconstruct the plurality of protective tubes in wafer level.

18. The method of claim 11 further comprising mounting the plurality of metal housings on a second tape to reconstruct the plurality of metal housings in wafer level.

19. A method for assembly comprising:
    attaching a lens stack onto an image sensor module, the lens stack including a plurality of lenses, a plurality of glass wafers, and a plurality of spacers;
    enclosing the lens stack in a protective tube including an outer wall having a snap-in latch element disposed thereon;
    enclosing the protective tube in a metal housing having a housing foot and an inner wall having an opposite snap-in latch element disposed thereon; and engaging the snap-in latch element of the protective tube with the opposite snap-in latch element of the metal housing to secure and align the image sensor module between the housing foot of the metal housing and the protective tube, wherein the protective tube engaged with the metal housing improves an electromagnetic compatibility (EMC) performance.

20. The method of claim 19 wherein attaching the lens stack onto the image sensor module comprises applying a first adhesive between the lens stack and the image sensor module.

21. The method of claim 19 further comprising applying a second adhesive between the housing foot of the metal housing and the image sensor module.

22. The method of claim 19 further comprising applying a third adhesive between the protective tube and the image sensor module.

* * * * *